(12) United States Patent
Lee et al.

(10) Patent No.: US 12,189,418 B2
(45) Date of Patent: Jan. 7, 2025

(54) ELECTRONIC DEVICE

(71) Applicant: SAMSUNG DISPLAY CO., LTD., Yongin-si (KR)

(72) Inventors: Jungil Lee, Seoul (KR); Min-Sung Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 126 days.

(21) Appl. No.: 18/061,595

(22) Filed: Dec. 5, 2022

(65) Prior Publication Data

US 2023/0099961 A1 Mar. 30, 2023

(30) Foreign Application Priority Data

Jan. 5, 2022 (KR) ........................ 10-2022-0001433

(51) Int. Cl.
*G06F 1/16* (2006.01)
*H04M 1/02* (2006.01)

(52) U.S. Cl.
CPC ............. *G06F 1/16* (2013.01); *H04M 1/0268* (2013.01)

(58) Field of Classification Search
CPC .................................................... H04M 1/0286
See application file for complete search history.

(56) References Cited

U.S. PATENT DOCUMENTS

| | | | |
|---|---|---|---|
| 2019/0132947 A1* | 5/2019 | Koo | G09F 9/301 |
| 2020/0233464 A1* | 7/2020 | Lee | G06F 1/1622 |
| 2020/0356145 A1* | 11/2020 | Choi | G09F 9/301 |
| 2020/0401275 A1* | 12/2020 | Shin | G06F 3/0445 |
| 2021/0066626 A1 | 3/2021 | Park et al. | |
| 2021/0119171 A1 | 4/2021 | Kim et al. | |
| 2021/0124393 A1 | 4/2021 | Lee | |
| 2021/0165458 A1 | 6/2021 | Lee | |

FOREIGN PATENT DOCUMENTS

| | | |
|---|---|---|
| KR | 10-2021-0000359 | 1/2021 |
| KR | 10-2021-0025747 | 3/2021 |
| KR | 10-2021-0047389 | 4/2021 |

* cited by examiner

*Primary Examiner* — Mukundbhai G Patel
(74) *Attorney, Agent, or Firm* — F. Chau & Associates, LLC

(57) ABSTRACT

An electronic device includes a display module including a first non-folding portion, a first folding portion, a second non-folding portion, a second folding portion, and a third non-folding portion. The electronic device further includes a first plate disposed under the display module and including first openings overlapping the first folding portion and second openings, a second plate including a first substrate, a second substrate, and a third substrate, an adhesive layer disposed between the first plate and the second plate and including a first portion overlapping the first folding portion and a second portion spaced apart from the first portion, and a plurality of sticks disposed between the second substrate and the third substrate and spaced apart from each other in the first direction. A portion of the second portion overlapping the second folding portion is exposed through spaces between the sticks.

22 Claims, 14 Drawing Sheets

ELECTRONIC DEVICE

CROSS-REFERENCE TO RELATED APPLICATIONS

This U.S. non-provisional patent application claims priority under 35 U.S.C. § 119 to Korean Patent Application No. 10-2022-0001433, filed on Jan. 5, 2022, the disclosure of which is hereby incorporated by reference in its entirety.

TECHNICAL FIELD

Embodiments of the present disclosure relate to a foldable electronic device, and more particularly, to an electronic device including a plate coupled to a hinge member.

DISCUSSION OF RELATED ART

Various types of electronic devices are being used to provide image information, including electronic devices having a flexible display module that is foldable or bendable. Unlike a rigid electronic device, a flexible electronic device is able to be folded, rolled, or bent. Since the shape of the flexible electronic device may be changed in various ways, it is convenient to carry the flexible electronic device regardless of the size of the display screen of the device.

A flexible electronic device may utilize a hinge member to maintain a folded state of the display module without hindering the folding or bending operation.

SUMMARY

Embodiments of the present disclosure provide an electronic device including a plate disposed under a display module and coupled to a hinge member.

Embodiments of the present disclosure provide an electronic device including a display module including a first non-folding portion, a first folding portion configured to be folded and having a predetermined radius of curvature when folded, a second non-folding portion, a second folding portion configured to be folded and having a radius of curvature different from the radius of curvature of the first folding portion when folded, and a third non-folding portion, which are spaced apart from each other in a first direction. The electronic device further includes a first plate disposed under the display module and including a plurality of first openings overlapping the first folding portion and a plurality of second openings overlapping the second folding portion, a second plate including a first substrate overlapping a portion of the first folding portion and the first non-folding portion, a second substrate spaced apart from the first substrate and overlapping a portion of the first folding portion and the second non-folding portion, and a third substrate spaced apart from the second substrate and overlapping the third non-folding portion, an adhesive layer disposed between the first plate and the second plate and including a first portion overlapping the first folding portion and a second portion spaced apart from the first portion, and a plurality of sticks disposed between the second substrate and the third substrate and spaced apart from each other in the first direction. A portion of the second portion of the adhesive layer overlapping the second folding portion is exposed through spaces between adjacent sticks among the sticks.

In an embodiment, each of the sticks has a thickness equal to or greater than about 80 micrometers and equal to or less than about 1000 micrometers.

In an embodiment, a pitch between the sticks adjacent to each other is equal to or greater than about 100 micrometers and equal to or less than about 300 micrometers.

In an embodiment, each of the sticks has a width in the first direction that is about equal to or greater than two times and about equal to or smaller than three times of a width of a portion of the first plate, which is disposed between the second openings adjacent to each other.

In an embodiment, each of the sticks has a width that gradually decreases in a direction from the first plate toward the second plate.

In an embodiment, the electronic device further includes a hinge member disposed under the second plate, configured to be folded with the display module, and including first guide portions overlapping the first folding portion and second guide portions overlapping the second folding portion.

In an embodiment, at least one of the second guide portions is coupled to at least one of the sticks.

In an embodiment, the electronic device further includes a nut disposed under at least one of the sticks and a bolt provided to one of the second guide portions and fastened to the nut.

In an embodiment, the electronic device further includes an intermediate adhesive layer, and the intermediate adhesive layer is disposed between the second plate and the hinge member and includes a third portion overlapping the first non-folding portion, a fourth portion spaced apart from the third portion and overlapping the second non-folding portion, and a fifth portion spaced apart from the fourth portion with the sticks interposed therebetween.

In an embodiment, each of the sticks has a thickness different from a thickness of the second plate.

In an embodiment, the electronic device further includes an intermediate adhesive layer disposed between the second plate and the hinge member and including a third portion overlapping the first non-folding portion and a fourth portion spaced apart from the third portion. The sticks are attached to a portion of the fourth portion, which overlaps the second folding portion.

In an embodiment, an area in which the second openings of the first plate are arranged is greater than an area of the first plate in which the first openings are arranged.

In an embodiment, the display module includes an upper surface through which an image is displayed and a lower surface opposite to the upper surface, the first folding portion is configured to be folded such that the upper surface of the first non-folding portion faces the upper surface of the second non-folding portion, and the second folding portion is configured to be folded such that the lower surface of the second non-folding portion faces the lower surface of the third non-folding portion.

In an embodiment, the first folding portion includes extension portions adjacent to the first non-folding portion and the second non-folding portion and a curved portion disposed between the extension portions, and a separation distance between the extension portions adjacent to each other is changed along the first direction when the first folding portion is in a folded state.

In an embodiment, the second folding portion is configured to be folded with respect to two folding axes, and a width in the first direction of a stick disposed between the folding axes is greater than a width in the first direction of the sticks adjacent to the stick disposed between the two folding axes.

In an embodiment, the electronic device further includes a window disposed on the display module, a protective layer, and a barrier layer, and the protective layer and the barrier layer are disposed between the first plate and the display module.

In an embodiment, the second plate includes one of a metal material and a plastic material.

In an embodiment, the first plate includes one of stainless steel, titanium, and a reinforced fiber composite material.

Embodiments of the present disclosure provide an electronic device including a display module including a first non-folding portion, a first folding portion configured to be folded and having a predetermined radius of curvature when folded, a second non-folding portion, a second folding portion configured to be folded and having a radius of curvature different from the radius of curvature of the first folding portion when folded, and a third non-folding portion, which are spaced apart from each other in a first direction. The electronic device further includes a first plate disposed under the display module and including a plurality of first openings overlapping the first folding portion and a plurality of second openings overlapping the second folding portion, a second plate including a first substrate overlapping a portion of the first folding portion and the first non-folding portion, a second substrate spaced apart from the first substrate and overlapping a portion of the first folding portion and the second non-folding portion, and a third substrate spaced apart from the second substrate and overlapping the third non-folding portion, a plurality of sticks disposed between the second substrate and the third substrate and spaced apart from each other in the first direction, and a hinge member disposed under the second plate, configured to be folded with the display module, and including first guide portions overlapping the first folding portion and second guide portions overlapping the second folding portion. At least one of the second guide portions is coupled to at least one of the sticks.

In an embodiment, the electronic device further includes a nut disposed under at least one of the sticks and a bolt provided to one of the second guide portions and fastened to the nut.

In an embodiment, the electronic device further includes an intermediate adhesive layer disposed between the second plate and the hinge member and including a first portion overlapping the first non-folding portion and a second portion spaced apart from the first portion. The second guide portions are attached to the sticks and a portion of the intermediate adhesive layer, which overlaps the second folding portion.

In an embodiment, the display module includes an upper surface through which an image is displayed and a lower surface opposite to the upper surface, the first folding portion is configured to be folded such that the upper surface of the first non-folding portion faces the upper surface of the second non-folding portion, and the second folding portion is configured to be folded such that the lower surface of the second non-folding portion faces the lower surface of the third non-folding portion.

According to embodiments of the present disclosure, the sticks disposed in the plate are coupled to the hinge member in the area where the components of the display device are outwardly folded. Thus, embodiments may omit a separate fastening member to couple the hinge member to a lower member, and the hinge member and the display module are stably coupled to each other when being outwardly folded. Accordingly, the folding characteristics of the electronic device may be improved.

BRIEF DESCRIPTION OF THE DRAWINGS

The above and other features of the present disclosure will become readily apparent by describing in detail embodiments thereof with reference to the accompanying drawings, in which.

DETAILED DESCRIPTION

Figure 1:
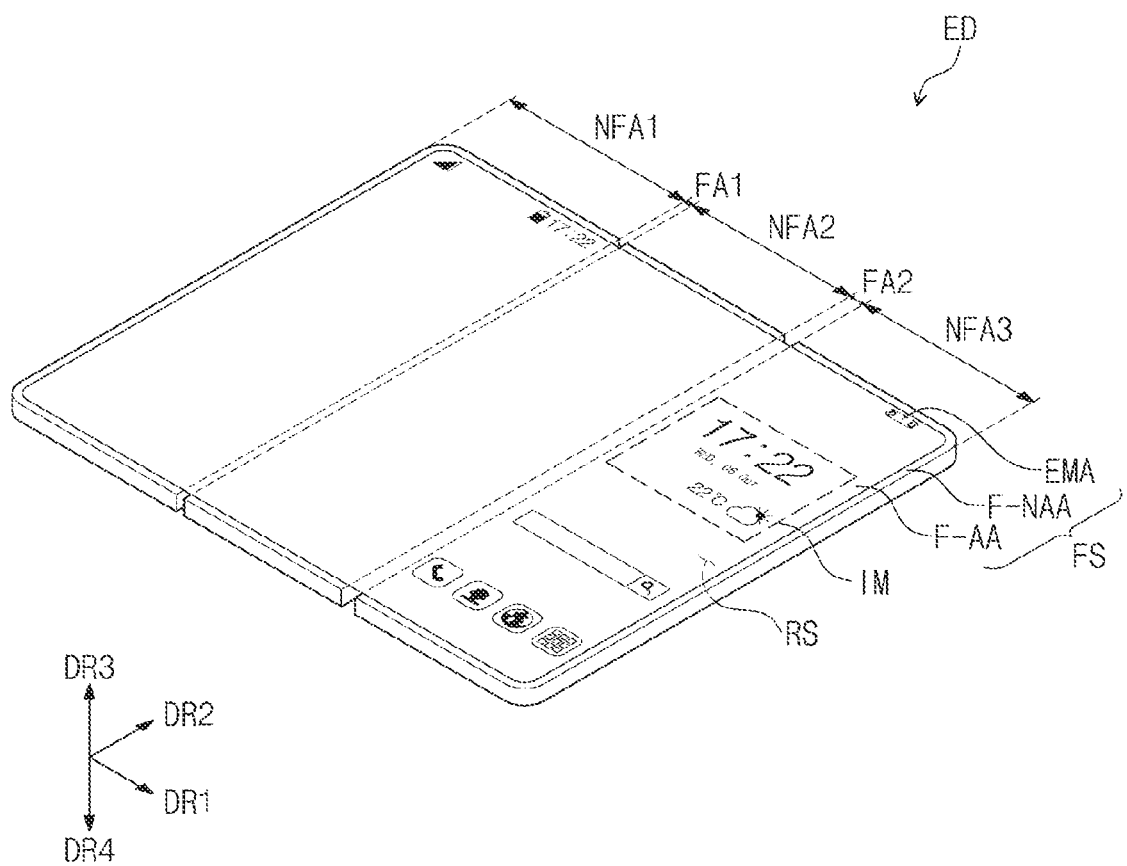
FIG. 1 is a perspective view of an unfolded state of an electronic device according to an embodiment of the present disclosure.

Embodiments of the present disclosure will be described more fully hereinafter with reference to the accompanying drawings. Like reference numerals may refer to like elements throughout the accompanying drawings.

It will be understood that when a component such as a film, a region, a layer, a portion, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

As used herein, the term "and/or" may include any and all combinations of one or more of the associated listed items.

It will be understood that, although the terms "first", "second", etc. may be used herein to describe various elements, these elements should not be limited by these terms. These terms are only used to distinguish one element from another element. Thus, a "first" element discussed below could be termed a "second" element without departing from the teachings of the present disclosure.

As used herein, the singular forms, "a", "an" and "the" are intended to include the plural forms as well, unless the context clearly indicates otherwise.

Spatially relative terms, such as "beneath", "below", "lower", "above", "upper" etc., may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. It will be further understood that when two components or directions are described as extending substantially parallel or perpendicular to each other, the two components or directions extend exactly parallel or perpendicular to each other, or extend approximately parallel or perpendicular to each other within a measurement error as would be understood by a person having ordinary skill in the art. Other uses of these terms and similar terms to describe the relationships between components should be interpreted in a like fashion.

Figure 2:
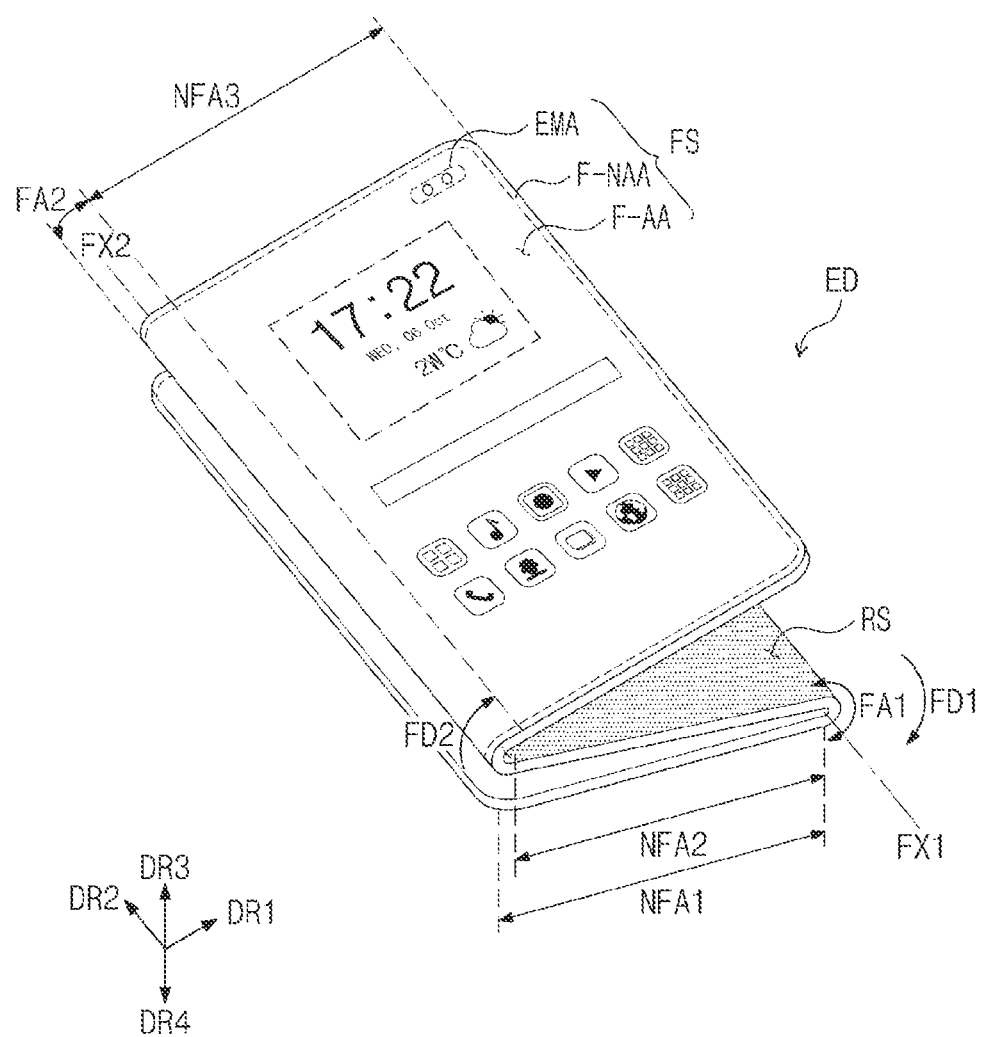
FIG. 2 is a perspective view of an electronic device that is being folded according to an embodiment of the present disclosure.
Figure 3A:
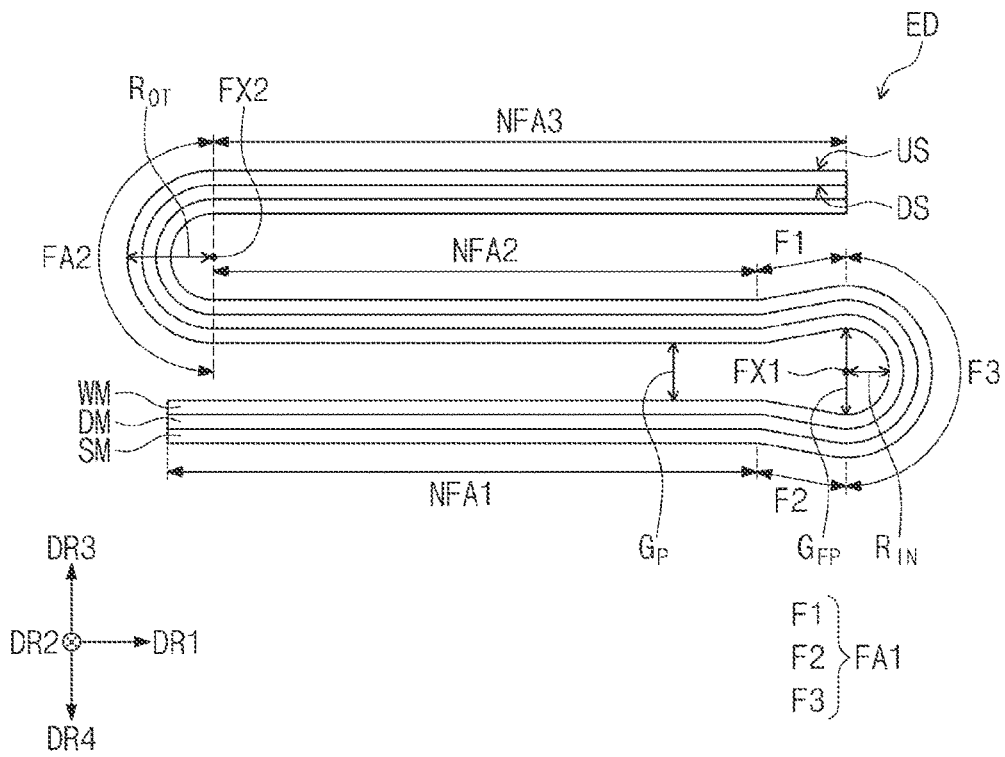
FIG. 3A is a cross-sectional view of a folded state of an electronic device according to an embodiment of the present disclosure.
Figure 3B:
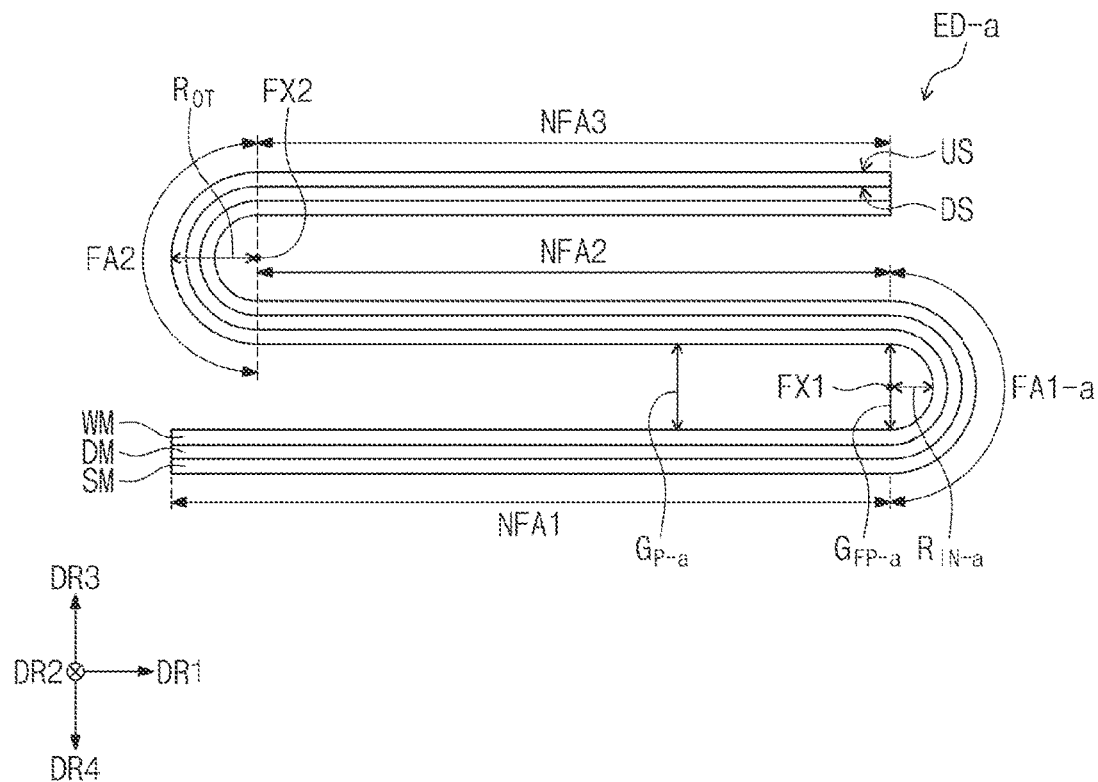
FIG. 3B is a cross-sectional view of a folded state of an electronic device according to an embodiment of the present disclosure.
Figure 3C:
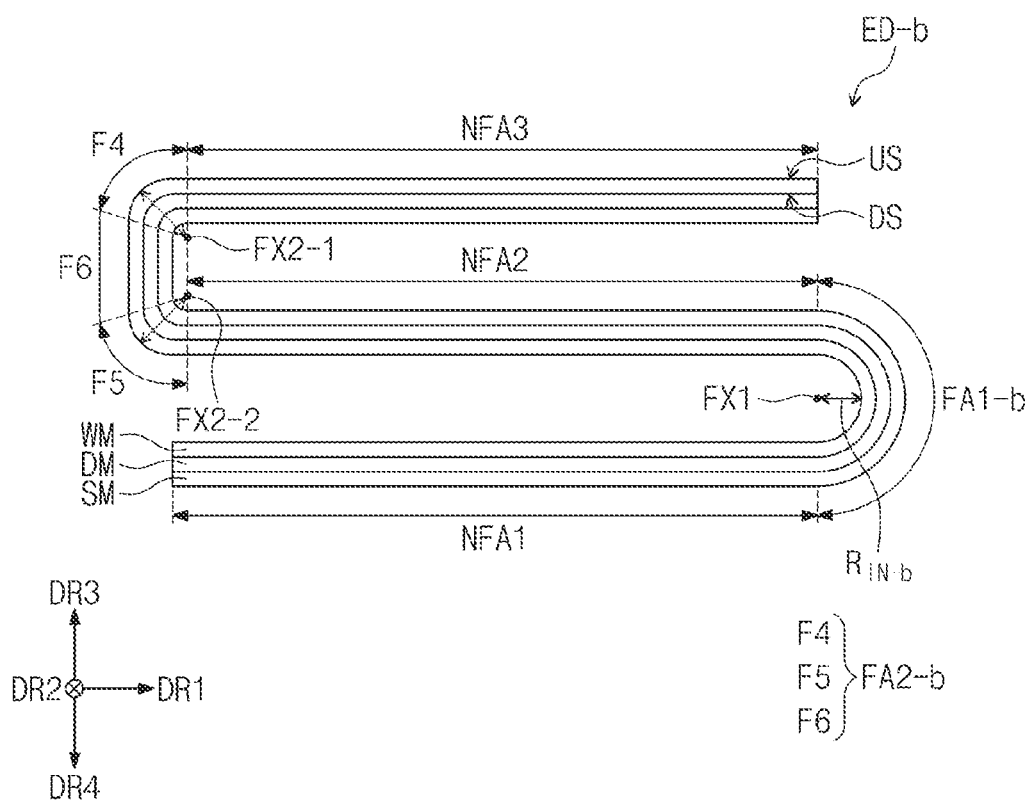
FIG. 3C is a cross-sectional view of a folded state of an electronic device according to an embodiment of the present disclosure.

FIG. 1 is a perspective view of an unfolded state of an electronic device ED according to an embodiment of the present disclosure. FIG. 2 is a perspective view of the electronic device ED that is being folded according to an embodiment of the present disclosure. FIG. 3A is a cross-sectional view of a folded state of the electronic device ED according to an embodiment of the present disclosure. FIG. 3B is a cross-sectional view of a folded state of an electronic device ED-a according to an embodiment of the present disclosure. FIG. 3C is a cross-sectional view of a folded state of an electronic device ED-b according to an embodiment of the present disclosure.

Herein, when a component is described as being "configured to be folded", it may mean that the component is foldable such that it may transition between a folded state and an unfolded state.

The electronic device ED may be a device that is activated in response to electrical signals. The electronic device ED may be, for example, a mobile phone, a tablet computer, a car navigation unit, a game unit, a wearable device, etc. However, the electronic device ED is not limited thereto. FIG. 1 shows the mobile phone as a representative example of the electronic device ED.

In FIG. 1 and the following figures, first, second, third, and fourth directional axes DR1, DR2, DR3, and DR4 are shown. Directions indicated by the first, second, third, and fourth directional axes DR1, DR2, DR3, and DR4 may be relative to each other and may be changed to other directions.

Referring to FIG. 1, the electronic device ED may include a display surface FS that is substantially parallel to a plane defined by the first direction DR1 and the second direction DR2 crossing the first direction DR1 in an unfolded state of the electronic device ED. The electronic device ED may provide an image IM to a user through the display surface FS. The electronic device ED may display the image IM through the display surface FS that is substantially parallel to each of the first direction DR1 and the second direction DR2 toward the third direction DR3. For example, the image IM may be displayed in the third direction DR3.

In embodiments of the present disclosure, front (or upper) and rear (or lower) surfaces of each components may be defined with respect to a direction in which the image IM is displayed. In the following description, the direction in which the image IM is displayed may be referred to as the third direction DR3, and the fourth direction DR4 may be defined as a direction opposite to the third direction DR3.

The electronic device ED may sense an external input applied thereto from outside of the electronic device ED. The external input may include various forms of inputs provided from outside of the electronic device ED. For example, the external inputs may include an external input (e.g., a hovering input) applied when approaching close to or in proximity to the electronic device ED at a predetermined distance as well as a touch input by a user's body part (e.g., a user's hand). In addition, the external inputs may be provided in the form of, for example, force, pressure, temperature, light, etc.

The display surface FS of the electronic device ED may include an active area F-AA and a peripheral area F-NAA. The active area F-AA may be activated in response to an electrical signal. The electronic device ED may display the image IM through the active area F-AA, and various external inputs may be sensed through the active area F-AA. The peripheral area F-NAA may be defined adjacent to the active area F-AA. The peripheral area F-NAA may have a predetermined color.

The active area F-AA may include an electronic module area EMA. Various electronic modules may be disposed in the electronic module area EMA. For example, the electronic module may include at least one of a camera, a speaker, an optical sensor, and a thermal sensor. The electronic module area EMA may sense an external subject through the display surface FS or may provide a sound signal, such as a voice, to outside of the electronic device ED through the display surface FS. In addition, the electronic module may include a plurality of components. However, the electronic module is not limited thereto.

The electronic module area EMA may be surrounded by the active area F-AA and the peripheral area F-NAA. The electronic module area EMA may be defined in the active area F-AA, however, the electronic module area EMA is not limited thereto. In addition, according to embodiments, when the electronic modules disposed in the electronic module area EMA are deactivated, the electronic module area EMA is not perceived by a user, and a video or a still image may be displayed through the display surface FS.

A rear surface RS of the electronic device ED may be opposite to the display surface FS. According to an embodiment, the rear surface RS may correspond to an external surface of the electronic device ED, and the video or the still image is not displayed through the rear surface RS. However, embodiments of the present disclosure are not limited thereto. For example, according to embodiments, the rear surface RS may serve as a display surface through which the video or the still image is displayed. In addition, according to an embodiment, the electronic device ED may further include an electronic module area defined in the rear surface RS. Various electronic modules such as, for example, a camera, a speaker, an optical sensor, etc., may be disposed in the electronic module area defined in the rear surface RS.

The peripheral area F-NAA may surround the active area F-AA in the electronic device ED. Accordingly, the active area F-AA may have a shape that is substantially defined by the peripheral area F-NAA. However, this is merely an example. According to embodiments, the peripheral area F-NAA may be defined adjacent to only one side of the active area F-AA or may be omitted. According to an embodiment, the electronic device ED may include active areas of various shapes and is not limited thereto.

The electronic device ED may include folding portions FA1 and FA2 and non-folding portions NFA1, NFA2, and NFA3. The electronic device ED may include a first non-folding portion NFA1, a first folding portion FA1, a second non-folding portion NFA2, a second folding portion FA2, and a third non-folding portion NFA3, which are sequentially arranged in the first direction DR1. The first non-folding portion NFA1 and the second non-folding portion NFA2 may be spaced apart from each other with the first folding portion FA1 interposed therebetween, and the second non-folding portion NFA2 and the third non-folding portion NFA3 may be spaced apart from each other with the second folding portion FA2 interposed therebetween.

In embodiments of the present disclosure, the folding portions FA1 and FA2 and the non-folding portions NFA1, NFA2, and NFA3 may respectively correspond to folding portions and non-folding portions of components included in the electronic device ED.

However, embodiments of the present disclosure are not limited thereto. For example, the number of the folding portions and the number of the non-folding portions are not limited to those shown in FIG. 1. For example, according to embodiments, the number of the folding portions may be three or more, and the number of the non-folding portions may be four or more.

Referring to FIG. 2, the electronic device ED may include the first folding portion FA1 folded with respect to a first folding axis FX1 extending in the second direction DR2, and the second folding portion FA2 folded with respect to a second folding axis FX2 extending in the second direction DR2 and spaced apart from the first folding axis FX1. The second folding axis FX2 may be spaced apart from the first folding axis FX1 in the first direction DR1. However, embodiments of the present disclosure are not limited thereto, and the first folding axis FX1 and the second folding axis FX2 may be substantially parallel to an arbitrary direction rather than the second direction DR2 according to embodiments.

In the electronic device ED, the first folding portion FA1 may be folded in a first folding direction FD1, and the second folding portion FA2 may be folded in a second folding direction FD2. According to an embodiment, the first folding direction FD1 may be a direction in which the electronic device ED is folded to allow the display surface FS of the first non-folding portion NFA1 and the display surface FS of the second non-folding portion NFA2 to face each other.

The second folding direction FD2 may be a direction in which the electronic device ED is folded to allow the display surface FS of the third non-folding portion NFA3 to be exposed when folded. Accordingly, the second folding direction FD2 may be a direction in which the electronic device ED is folded to allow the rear surface RS of the second non-folding portion NFA2 and the rear surface RS of the third non-folding portion NFA3 to face each other.

In an embodiment according to FIG. 2, the first folding axis FX1 may be an imaginary axis disposed above the display surface FS. In addition, the second folding axis FX2 may be an imaginary axis extending in the second direction DR2 and may be disposed under the rear surface RS.

In embodiments of the present disclosure, a state in which a portion of the electronic device ED is folded along the first folding direction FD1 may be referred to as an inner-folding state, and a state in which a portion of the electronic device ED is folded along the second folding direction FD2 may be referred to as an outer-folding state.

FIGS. 3A to 3C are cross-sectional views of a folded state of a window WM, a display module DM, and a lower member SM of the electronic devices ED, ED-a, and ED-b, according to embodiments of the present disclosure.

Referring to FIG. 3A, the window WM may be disposed on the display module DM. The window WM may be disposed at an outermost position of the electronic device ED and may provide the display surface FS (refer to FIG. 1).

The window WM may include an upper surface US providing the display surface FS and a lower surface DS opposite to the upper surface US and facing the display module DM.

In an embodiment, when the first folding portion FA1 of the electronic device ED is inwardly folded with respect to the first folding axis FX1, a portion of the upper surface US of the window WM, which overlaps the first non-folding portion NFA1, and a portion of the upper surface US of the window WM, which overlaps the second non-folding portion NFA2, may face each other. The first folding portion FA1 may be folded to have a first radius of curvature $R_{IN}$. The first radius of curvature $R_{IN}$ may correspond to a maximum distance from the first folding axis FX1 to the upper surface US of the window WM of the first folding portion FA1.

When the second folding portion FA2 of the electronic device ED is outwardly folded with respect to the second folding axis FX2, a portion of the upper surface US of the window WM, which overlaps the third non-folding portion NFA3, may be exposed. The second folding portion FA2 may be folded to have a second radius of curvature $R_{OT}$. The second radius of curvature $R_{OT}$ may correspond to a maximum distance from the second folding axis FX2 to the upper surface US of the window WM of the second folding portion FA2. The second radius of curvature $R_{OT}$ of the second folding portion FA2 that is outwardly folded may be greater than the first radius of curvature $R_N$ of the first folding portion FA1 that is inwardly folded.

A reference point of the first radius of curvature $R_{IN}$ and the second radius of curvature $R_{OT}$ may be defined as a maximum distance from the folding axis to the window WM. However, when the reference point of the first radius of curvature $R_{IN}$ and the second radius of curvature $R_{OT}$ is defined as a maximum distance from the folding axis to the lower member SM, the second radius of curvature $R_{OT}$ of the second folding portion FA2 that is outwardly folded may be smaller than the first radius of curvature $R_{IN}$ of the first folding portion FA1 that is inwardly folded.

The display module DM may include an upper surface adjacent to the window WM and a rear surface adjacent to the lower member SM. When the electronic device ED is inwardly folded in the first folding portion FA1, a compressive stress may be applied to a portion of the upper surface of the display module DM, which overlaps the first folding portion FA1, and a tensile stress may be applied to a portion of the rear surface of the display module DM, which overlaps the first folding portion FA1.

When the electronic device ED is outwardly folded in the second folding portion FA2, the compressive stress may be applied to the rear surface of the display module DM, which overlaps the second folding portion FA2, and the tensile stress may be applied to the upper surface of the display module DM, which overlaps the second folding portion FA2.

When the electronic device ED is inwardly folded in the first folding portion FA1, components disposed in the display module DM may be cracked by the compressive stress applied to the upper surface of the display module DM.

According to an embodiment, the first folding portion FA1 that is inwardly folded may include extension portions F1 and F2 and a curved portion F3 disposed between the extension portions F1 and F2.

A first extension portion F1 may be disposed between the second non-folding portion NFA2 and the curved portion F3, and a second extension portion F2 may be disposed between the first non-folding portion NFA1 and the curved portion F3. In the first folding portion FA1, a portion where the window WM, the display module DM, and the lower member SM are substantially folded may overlap the curved portion F3. Accordingly, the extension portions F1 and F2 may be substantially flat.

In an embodiment, when the first folding portion FA1 is in the folded state, a gap $G_{FP}$ between the extension portions F1 and F2 may be varied.

As an example, a first gap between first ends of the extension portions F1 and F2, which are adjacent to the non-folding portions NFA1 and NFA2, may be smaller than a second gap between second ends of the extension portions F1 and F2, which are adjacent to the curved portion F3. In addition, the gap $G_{FP}$ between the extension portions F1 and F2 may gradually increase from the first gap to the second gap. The first gap may be a minimum gap of the gap $G_{FP}$ between the extension portions F1 and F2, and the second gap may be a maximum gap of the gap $G_{FP}$ between the extension portions F1 and F2.

According to an embodiment, since the extension portions F1 and F2 are provided between the curved portion F3 having the curvature and the non-folding portions NFA1 and NFA2, the first radius of curvature $R_{IN}$ may increase. Thus, the compressive stress applied to the upper surface of the display module DM overlapping the first folding portion FA1 may be reduced. Accordingly, in embodiments of the present disclosure, the components of the display module DM may be prevented from being cracked, and inner-folding characteristics of the electronic device ED may be improved.

Referring to FIG. 3B, a window WM may include an upper surface US providing the display surface FS (refer to FIG. 1) and a lower surface DS opposite to the upper surface US and facing a display module DM.

In an embodiment, when a first folding portion FA1-*a* of the electronic device ED-*a* is inwardly folded with respect to a first folding axis FX1, the upper surface US of the window WM, which overlaps a second non-folding portion NFA2, and the upper surface US of the window WM, which overlaps a first non-folding portion NFA1, may face each other.

In this case, the first folding portion FA1-*a* may be folded to have a first radius of curvature $R_{IN-a}$. The first radius of curvature $R_{IN-a}$ may correspond to a maximum distance from the first folding axis FX1 to the upper surface US of the window WM of the first folding portion FA1-*a*.

When a second folding portion FA2 of the electronic device ED-*a* is outwardly folded with respect to a second folding axis FX2, the upper surface US of the window WM, which overlaps a third non-folding portion NFA3, may be exposed. In this case, the second folding portion FA2 may be folded to have a second radius of curvature $R_{OT}$. The second radius of curvature $R_{OT}$ may correspond to a maximum distance from the second folding axis FX2 to the upper surface US of the window WM of the second folding portion FA2. The second radius of curvature $R_{OT}$ of the second folding portion FA2 that is outwardly folded may be greater than the first radius of curvature $R_{IN}$ of the first folding portion FA1-*a* that is inwardly folded.

According to an embodiment, a gap $G_{FP-a}$ between one end and the other end of the first folding portion FA1-*a*, which are respectively adjacent to the first non-folding portion NFA1 and the second non-folding portion NFA2, may be substantially the same as a gap $G_{P-a}$ between the first non-folding portion NFA1 and the second non-folding portion NFA2 when the first folding portion FA1-*a* is inwardly folded.

Referring to FIG. 3B, a window WM may include an upper surface US providing the display surface FS (refer to FIG. 1) and a lower surface DS opposite to the upper surface US and facing a display module DM.

In an embodiment, when a first folding portion FA1-*b* of the electronic device ED-*b* is inwardly folded with respect to a first folding axis FX1, the upper surface US of the window WM, which overlaps a second non-folding portion NFA2, and the upper surface US of the window WM, which overlaps a first non-folding portion NFA1, may face each other. In this case, the first folding area FA1-*b* may be folded to have a first radius of curvature $R_{IN-b}$. The first radius of curvature $R_{IN-b}$ may correspond to a maximum distance from the first folding axis FX1 to the upper surface of the window WM of the first folding area FA1-*b*.

A second folding portion FA2-*b* of the electronic device ED-*b* may be outwardly folded with respect to two folding axes FX2-1 and FX2-2.

A portion of a second folding portion FA2-*b*, which is adjacent to a third non-folding portion NFA3, may be folded with respect to a second-first folding axis FX2-1, and the other portion of the second folding portion FA2-*b*, which is adjacent to a second-second folding axis FX2-2, may be folded with respect to the second non-folding portion NFA2.

According to an embodiment, the second folding portion FA2-b may include curved portions F4 and F5 and an extension portion F6 disposed between the curved portions F4 and F5.

A first curved portion F4 may be folded with respect to the second-first folding axis FX2-1, and a second curved portion F5 may be folded with respect to the second-second folding axis FX2-2. The extension portion F6 may be a substantially flat area.

However, embodiments of the present disclosure are not limited thereto, and the second folding portion FA2-b, which is outwardly folded, may be folded with respect to three or more folding axes and is not limited thereto.

Figure 4A:
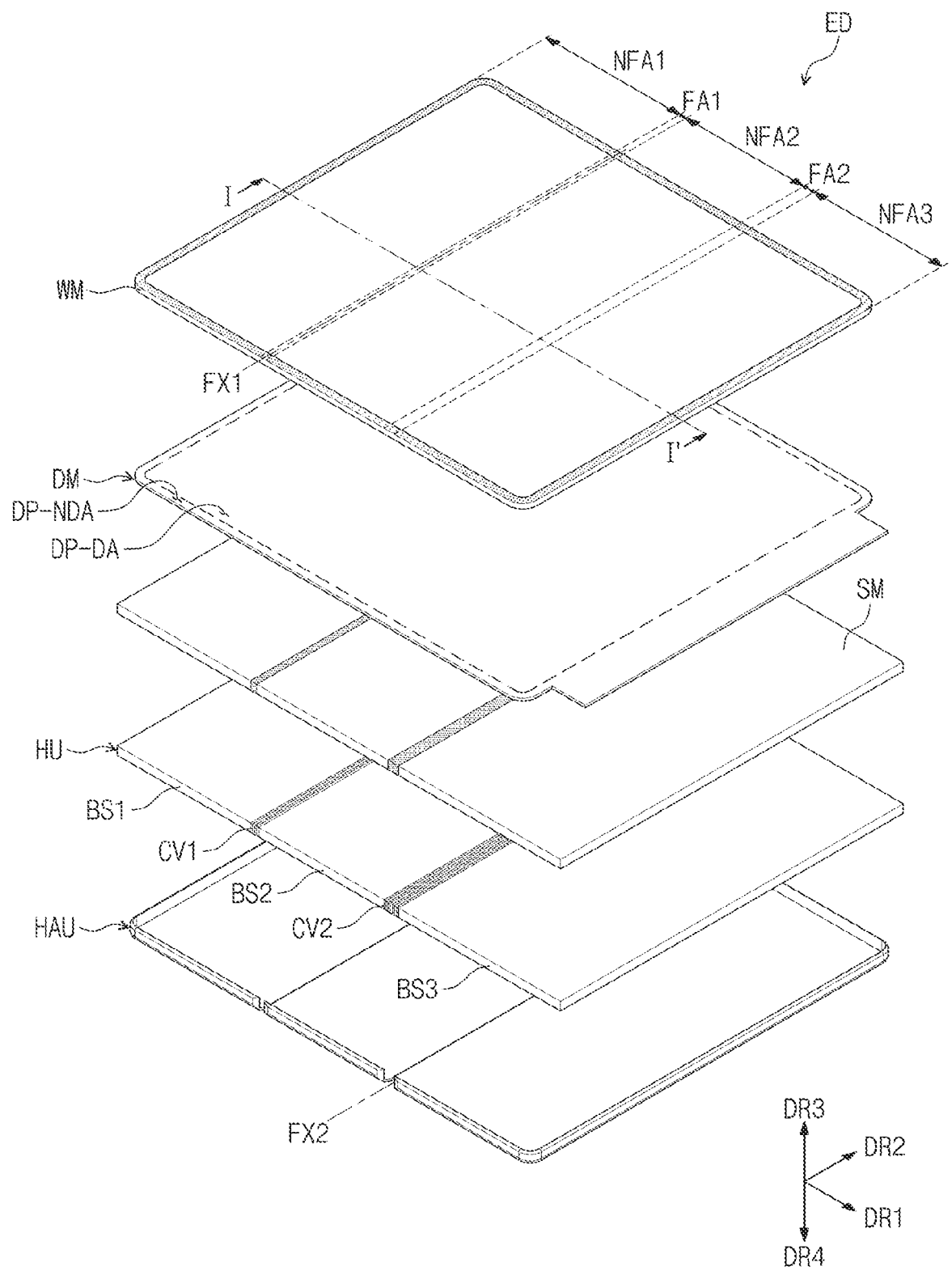
FIG. 4A is an exploded perspective view of an electronic device according to an embodiment of the present disclosure.
Figure 4B:
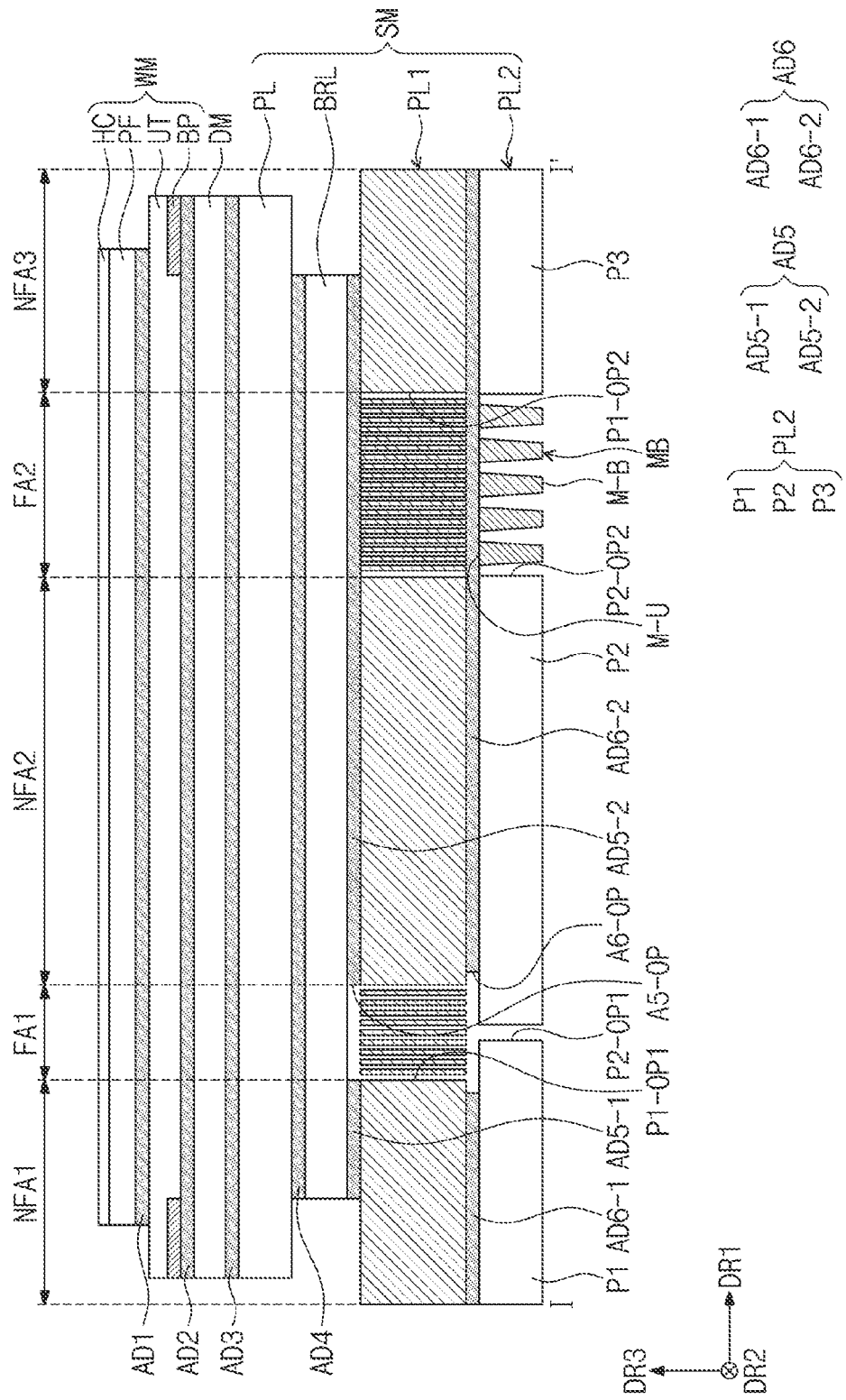
FIG. 4B is a cross-sectional view of an electronic device taken along line I-I' of FIG. 4A according to an embodiment of the present disclosure.

FIG. 4A is an exploded perspective view of the electronic device ED according to an embodiment of the present disclosure. FIG. 4B is a cross-sectional view of the electronic device ED taken along line I-I' of FIG. 4A according to an embodiment of the present disclosure.

Referring to FIGS. 4A and 4B, the electronic device ED may include the window WM, the display module DM, the lower member SM, a hinge member HU, and a housing HAU. The electronic module area EMA and the electronic module disposed in the electronic module area EMA described with reference to FIG. 1 are omitted.

The window WM may entirely cover the upper surface of the display module DM. The window WM may have a shape corresponding to a shape of the display module DM. The window WM may include an optically transparent insulating material. The window WM may be a glass substrate or a polymer substrate. The window WM may be formed of a glass material. As an example, the window WM may be a glass substrate in which at least a portion is chemically strengthened.

The display module DM may display the image in response to an electrical signal and may transmit/receive information about the external input. The display module DM may include a display area DP-DA and a non-display area DP-NDA. The display area DP-DA may be defined as an area in which the image provided from the display module DM is displayed.

The non-display area DP-NDA may be defined adjacent to the display area DP-DA. As an example, the non-display area DP-NDA may surround the display area DP-DA. However, this is merely an example, and the non-display area DP-NDA may be defined in various shapes and is not limited thereto. According to an embodiment, the display area DP-DA of the display module DM may correspond to at least a portion of the active area F-AA (refer to FIG. 1).

According to an embodiment, the display module DM may include a display panel DP including at least a plurality of pixels. The display panel DP may be a light emitting type display panel. However, the display panel DP is not limited thereto. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot and a quantum rod.

The display module DM may include an input sensor that senses the external input. The input sensor may be disposed directly on the display panel DP through a successive process. The input sensor may include a plurality of sensing electrodes and a plurality of sensing insulating layers. The input sensor may sense the external input by a self-capacitance method or a mutual capacitance method. The input sensor may sense an input applied thereto by an active-type input device.

The hinge member HU may be disposed under the display module DM. The hinge member HU may guide components disposed on the hinge member HU such that the components disposed on the hinge member HU may be easily folded along the folding axes when the components disposed on the hinge member HU are folded. The hinge member HU may include base portions BS1, BS2, and BS3 respectively overlapping the non-folding portions NFA1, NFA2, and NFA3, and multi-joint units CV1 and CV2 disposed between the base portions BS1, BS2, and BS3. A first multi-joint unit CV1 may overlap the first folding portion FA1.

The first multi-joint unit CV1 may guide the electronic device ED to allow the first folding portion FA1 to be inwardly folded from the unfolded state of the electronic device ED. A second multi-joint unit CV2 may guide the electronic device ED to allow the second folding portion FA2 to be outwardly folded from the unfolded state of the electronic device ED. Configurations of the first and second multi-joint units CV1 and CV2 will be described in further detail below.

The electronic device ED may include the housing HAU accommodating the display module DM, the lower member SM, the hinge member HU, and the electronic module. The housing HAU may be coupled to the window WM and may define an appearance of the electronic device ED.

Figure 5:
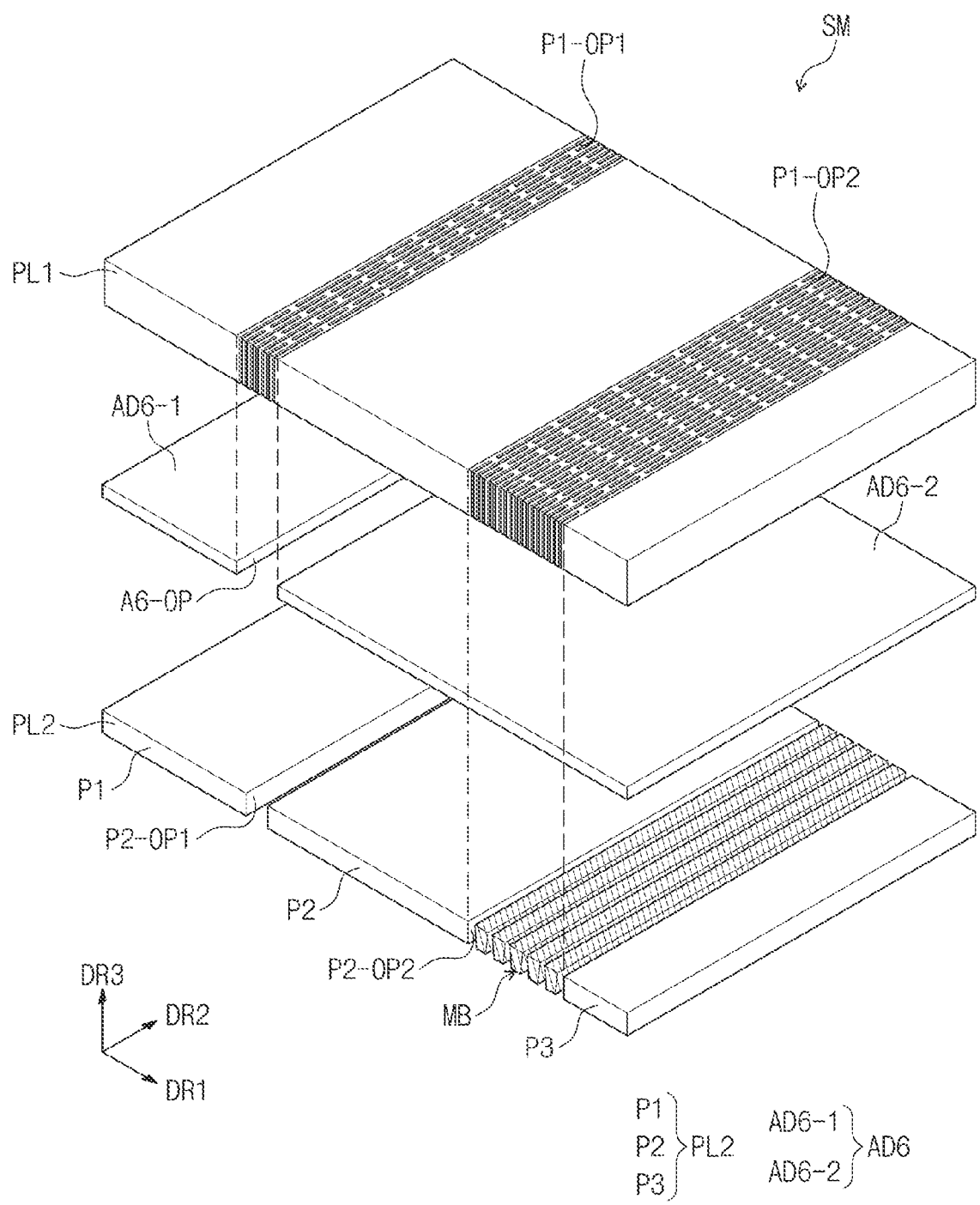
FIG. 5 is an exploded perspective view of a lower member according to an embodiment of the present disclosure.

Referring to FIGS. 4B and 5, the window WM may include a thin film glass substrate UT, a window protective layer PF disposed on the thin film glass substrate UT, and a bezel pattern BP disposed under the window protective layer PF. In addition, the window WM may further include a functional layer HC disposed on the window protective layer PF.

The window WM may include an adhesive layer AD1 (hereinafter referred to as a first adhesive layer) that attaches the window protective layer PF to the thin film glass substrate UT. Adhesive layers described hereinafter may include, for example, one of a pressure sensitive adhesive (PSA) film or an optically clear adhesive (OCA) film.

The window protective layer PF may be disposed on the thin film glass substrate UT. The window protective layer PF may protect the thin film glass substrate UT. In an embodiment, the window protective layer PF may have a thickness from about 25 um to about 200 um.

The window protective layer PF may include a synthetic resin film. The synthetic resin film of the window protective layer PF may include, for example, polyimide, polycarbonate, polyamide, triacetylcellulose, polymethylmethacrylate, or polyethylene terephthalate.

The functional layer HC may be disposed on the window protective layer PF. The functional layer HC may include at least one of, for example, a hard coating layer, an anti-fingerprint layer, and an anti-reflective layer. When the functional layer HC includes the hard coating layer, the functional layer HC may have a thickness from about 3 um to about 10 um.

The thin film glass substrate UT may be disposed under the window protective layer PF. The thin film glass substrate UT may have a thickness from about 25 um to about 100 um. The thin film glass substrate UT may be a chemically strengthened glass. The occurrence of crease in the thin film glass substrate UT may be minimized or reduced even though the folding and unfolding operations are repeatedly performed according to embodiments of the present disclosure.

The bezel pattern BP may overlap the peripheral area F-NAA shown in FIG. 1. The bezel pattern BP may be disposed on a rear surface of the thin film glass substrate UT. FIG. 4B shows the bezel pattern BP disposed on the rear surface of the thin film glass substrate UT. However, embodiments of the present disclosure are not limited thereto. According to an embodiment, the bezel pattern BP may be disposed between the window protective layer PF and the thin film glass substrate UT. The bezel pattern BP may be a colored light shielding layer and may be formed by a coating method. The bezel pattern BP may include a base material and a pigment or a dye mixed with the base material.

The display module DM may be coupled to the window WM by a second adhesive layer AD2.

The lower member SM may be disposed under the display module DM and may protect the display module DM from an external impact. In addition, one configuration of the lower member SM may be coupled to the hinge member HU, which may increase adhesion between the hinge member HU and the display module DM.

The lower member SM may include a panel protective layer PL, a barrier layer BRL, a first plate PL1, a second plate PL2, and sticks MB.

The display module DM may be coupled to the panel protective layer PL by a third adhesive layer AD3, the panel protective layer PL may be coupled to the barrier layer BRL by a fourth adhesive layer AD4, the barrier layer BRL may be coupled to the first plate PL1 by a fifth adhesive layer AD5, and the first plate PL1 may be coupled to the second plate PL2 by a sixth adhesive layer AD6. The second to sixth adhesive layers AD2 to AD6 may include the same material as that of the first adhesive layer AD1.

The panel protective layer PL may be disposed under the display module DM. The panel protective layer PL may protect a lower portion of the display module DM. The panel protective layer PL may include a flexible synthetic resin film. As an example, the panel protective layer PL may include polyethylene terephthalate. The panel protective layer PL may have a thickness from about 50 um to about 100 um.

The barrier layer BRL may be disposed under the panel protective layer PL. The barrier layer BRL may increase a resistance to a compressive force caused by external pressure. Accordingly, the barrier layer BRL may prevent the display module DM from being deformed.

The barrier layer BRL may include a flexible plastic material such as, for example, polyimide or polyethylene terephthalate. The barrier layer BRL may be a colored film with low light transmittance. The barrier layer BRL may absorb a light incident thereto from outside of the electronic device ED. As an example, the barrier layer BRL may be a black synthetic resin film. Accordingly, in embodiments, when viewed in a direction facing the electronic device ED from above the window protective layer PF (e.g., when viewed in a plan view), components disposed under the barrier layer BRL are not visible to the user. The barrier layer BRL may have a thickness from about 25 um to about 100 um.

The barrier layer BRL may be coupled to the first plate PL1 by the fifth adhesive layer AD5.

The fifth adhesive layer AD5 may include a first portion AD5-1 and a second portion AD5-2. The first portion AD5-1 and the second portion AD5-2 may be spaced apart from each other by a predetermined separation space A5-OP in the first direction DR1. In an embodiment, the first portion AD5-1 may overlap the first non-folding portion NFA1, and the second portion AD5-2 may overlap the second non-folding portion NFA2, the second folding portion FA2, and the third non-folding portion NFA3. Accordingly, in embodiments, the first portion AD5-1 and the second portion AD5-2 do not overlap the first folding portion FA1.

The first plate PL1 may be disposed under the barrier layer BRL. The first plate PL1 may support components disposed thereon. The first plate PL1 may have a strength greater than that of the barrier layer BRL.

The first plate PL1 may be provided with first openings P1-OP1 defined therethrough to overlap the first folding portion FA1 and second openings P1-OP2 defined therethrough to overlap the second folding portion FA2. Each of the first openings P1-OP1 and the second openings P1-OP2 may penetrate from an upper surface of the first plate PL1 to a rear surface of the first plate PL1. The first openings P1-OP1 and the second openings P1-OP2 may have a lattice shape in a plan view. Spaces between the first openings P1-OP1 adjacent to each other may be connected to each other, and spaces between the second openings P1-OP2 adjacent to each other may be connected to each other.

In an embodiment, a width in the first direction DR1 of an area in which the first openings P1-OP1 are defined may be smaller than a width in the first direction DR1 of an area in which the second openings P1-OP2 are defined.

As the first plate PL1 is provided with the first openings P1-OP1 and the second openings P1-OP2, which overlap the folding portions FA1 and FA2, flexibility of the first plate PL1 may be increased.

The first plate PL1 may include one of, for example, stainless steel, titanium, and reinforced fiber composite material. The reinforced fiber composite material may be, for example, carbon fiber reinforced plastic (CFRP) or glass fiber reinforced plastic (GFRP).

The first plate PL1 may have a thickness that is variable depending on a radius of curvature of the folding portions FA1 and FA2.

In an embodiment, the fifth adhesive layer AD5 may be provided with the separation space A5-OP overlapping the first folding portion FA1, and thus, when the first plate PL1 is inwardly folded, the first plate PL1 may be easily folded without being interfered with by the fifth adhesive layer AD5. In addition, stress applied to the rear surface of the barrier layer BRL overlapping the first folding portion FA1 may be reduced.

The first plate PL1 may be coupled to the second plate PL2 by the sixth adhesive layer AD6.

The sixth adhesive layer AD6 may include a first portion AD6-1 and a second portion AD6-2. The first portion AD6-1 and the second portion AD6-2 may be spaced apart from each other by a predetermined separation space A6-OP in the first direction DR1. In an embodiment, the first portion AD6-1 may overlap the first non-folding portion NFA1, and the second portion AD6-2 may overlap the second non-folding portion NFA2, the second folding portion FA2, and the third non-folding portion NFA3. Accordingly, in an embodiment, the first portion AD6-1 and the second portion AD6-2 do not overlap the first folding portion FA1.

The second plate PL2 may be disposed under the first plate PL1. According to embodiments of the present disclosure, the second plate PL2 may include a first portion P1 (a first substrate), a second portion P2 (a second substrate), and a third portion P3 (a third substrate).

The first portion P1, the second portion P2, and the third portion P3 may be spaced apart from each other in the first direction DR1. The first portion P1 may overlap the first non-folding portion NFA1 and a portion of the first folding portion FA1. The second portion P2 may overlap the other portion of the first folding portion FA1 and the second non-folding portion NFA2. The third portion P3 may overlap the third non-folding portion NFA3.

The first portion P1 and the second portion P2 may be spaced apart from each other by a first separation space P2-OP1 in the first direction DR1, and the second portion P2 and the third portion P3 may be spaced apart from each other by a second separation space P2-OP2 in the first direction DR1.

A width in the first direction DR1 of the first separation space P2-OP1 may be smaller than the width in the first direction DR1 of the first openings P1-OP1 of the first plate PL1. Accordingly, foreign substances may be prevented from entering the first openings P1-OP1 in the unfolded state.

The width in the first direction DR1 of the second separation space P2-OP2 may correspond to the width in the first direction DR1 of the second folding portion FA2.

In an embodiment, the sixth adhesive layer AD6 may include the separation space A6-OP overlapping the first folding portion FA1. Thus, when the second plate PL2 is inwardly folded, the second plate PL2 may be easily inwardly folded without being interfered with by the sixth adhesive layer AD6. In addition, the first plate PL1 overlapping the first folding portion FA1 may also be easily inwardly folded without being interfered with by the sixth adhesive layer AD6.

In an embodiment, the sticks MB may be disposed in the second separation space P2-OP2 between the second portion P2 and the third portion P3. Each of the sticks MB may include an upper surface M-U adjacent to the first plate PL1 and a rear surface M-B opposite to the upper surface M-U.

Each of the sticks MB may extend in the second direction DR2 in which the second folding axis FX2 (refer to FIG. 2) extends, and the sticks MB may be spaced apart from each other in the first direction DR1. The stick closest to the second portion P2 among the sticks MB may be spaced apart from a side surface of the second portion P2, which defines the second separation space P2-OP2, in the first direction DR1, and the stick closest to the third portion P3 among the sticks MB may be spaced apart from a side surface of the third portion P3, which defines the second separation space P2-OP2, in the first direction DR1.

In an embodiment, the sticks MB may be coupled to a portion of the second portion AD6-2 of the sixth adhesive layer AD6, which overlaps the second folding portion FA2. Accordingly, the upper surface M-U of each of the sticks MB may be in contact with the sixth adhesive layer AD6.

In embodiments of the present disclosure, the sticks MB may include one of a metal material and a plastic material. In addition, the sticks MB may include the same material as or a material different from that of the second plate PL2. However, the sticks MB are not limited thereto.

According to embodiments of the present disclosure, the sticks MB may be coupled to some components of the hinge member HU described with reference to FIG. 4A. The structure in which the sticks MB are coupled to the hinge member HU will be described in further detail below.

Figure 6:
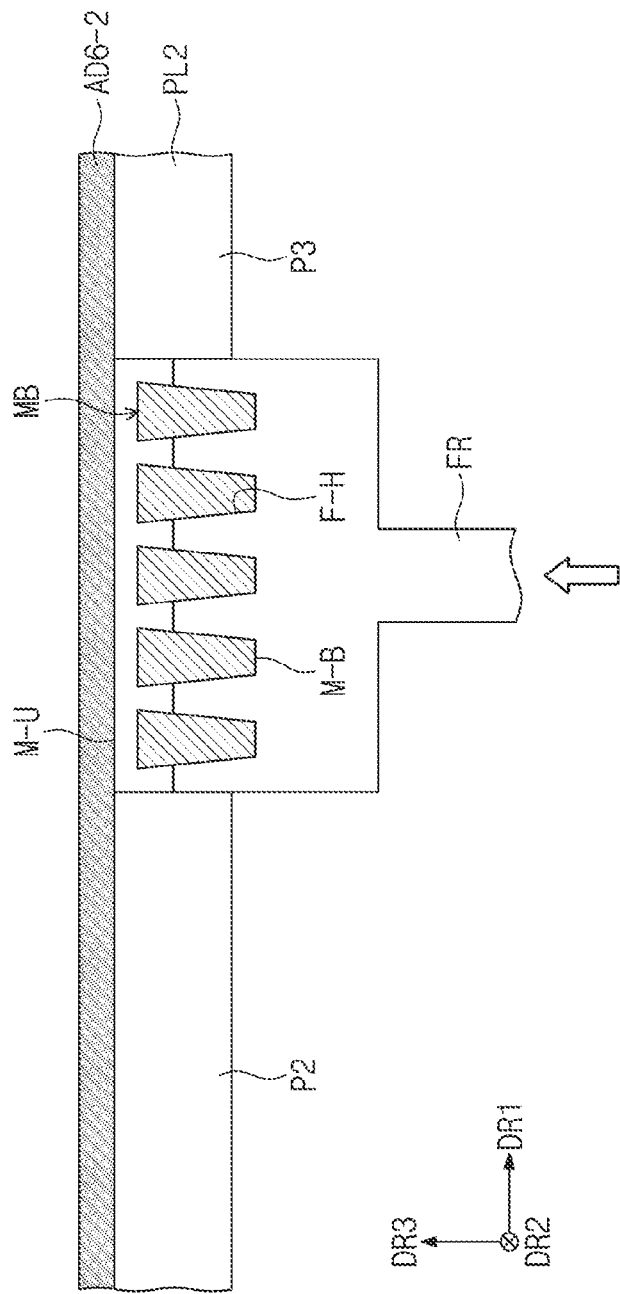
FIG. 6 is a cross-sectional view of a process of coupling sticks with a second plate according to an embodiment of the present disclosure.
Figure 7:
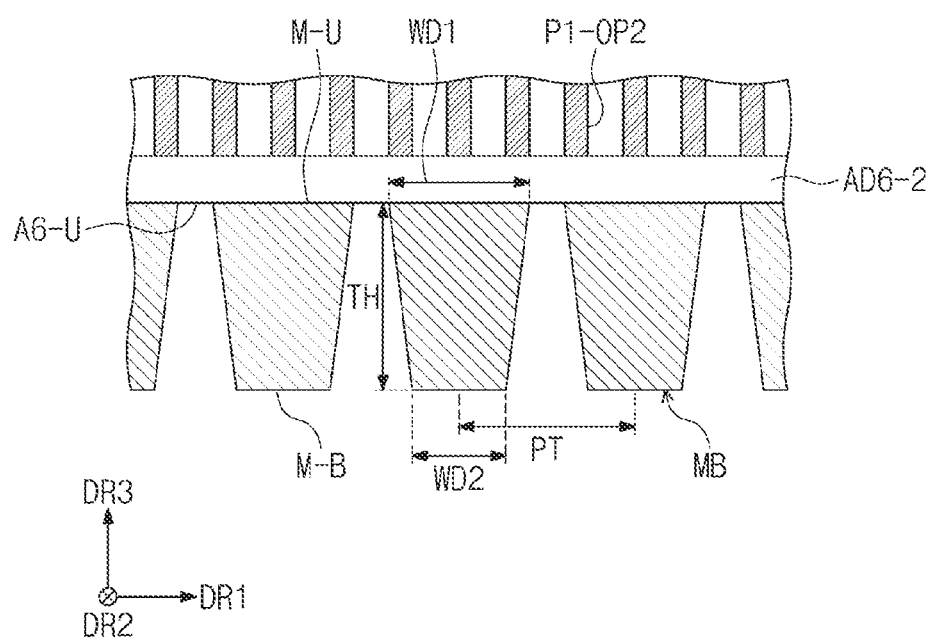
FIG. 7 is a cross-sectional view of an arrangement relation between sticks and a first plate according to an embodiment of the present disclosure.

FIG. 6 is a cross-sectional view of a process of coupling the sticks MB with the second plate PL2 according to an embodiment of the present disclosure. FIG. 7 is a cross-sectional view of an arrangement relation between the sticks MB and the first plate PL1 according to an embodiment of the present disclosure.

FIG. 6 schematically shows a process of attaching the sticks MB to the second portion AD6-2 of the sixth adhesive layer AD6 (refer to FIG. 5).

The sticks MB may be manufactured through an injection process, or the sticks MB may be substantially simultaneously patterned with the second plate PL2 in a manufacturing process of the second place PL2.

The sticks MB may be attached to the second portion AD6-2 by a coupling member FR. The coupling member FR may be provided with coupling grooves F-H defined therein to correspond to the number of the sticks MB. The coupling grooves F-H may extend in the second direction DR2 and may be spaced apart from each other in the first direction DR1. Each of the sticks MB may be coupled to a corresponding coupling groove among the coupling grooves F-H and may be pressed to the second portion AD6-2. In this case, the sticks MB may be spaced apart from each other in the first direction DR1.

Referring to FIG. 7, the sticks MB may have a thickness TH from about 80 um to about 1000 um. The thickness TH of the sticks MB may be similar to a thickness of the second plate PL2. In an embodiment, the thickness TH of the sticks MB is about the same as a thickness of the second plate PL2.

A pitch PT between the sticks MB may be within a range from about 100 um to about 300 um. When the electronic device ED is outwardly folded, the pitch PT between the sticks MB may increase as the radius of curvature of the second folding portion FA2 increases.

Each of sticks MB may have a width gradually decreasing from the upper surface M-U to the rear surface M-B. Accordingly, a first width WD1 of the upper surface M-U may be greater than a second width WD2 of the rear surface M-B, and thus, each of the sticks MB may have an inverted trapezoid shape.

According to embodiments of the present disclosure, the second portion AD6-2 disposed between the sticks MB adjacent to each other may be exposed without being covered by the sticks MB. For example, the second portion AD6-2 may be exposed through the spaces between adjacent sticks among the sticks MB. In addition, two or three second openings P1-OP2 among the second openings P1-OP2 of the first plate PL1 may overlap one stick MB.

Figure 8A:
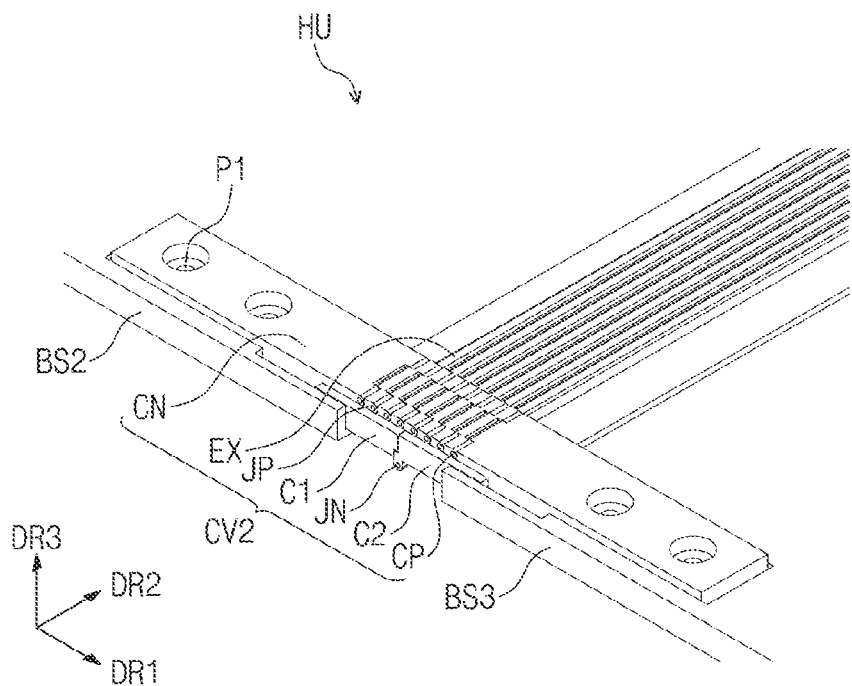
FIGS. 8A and 8B are perspective views of a hinge member according to an embodiment of the present disclosure.
Figure 8B:
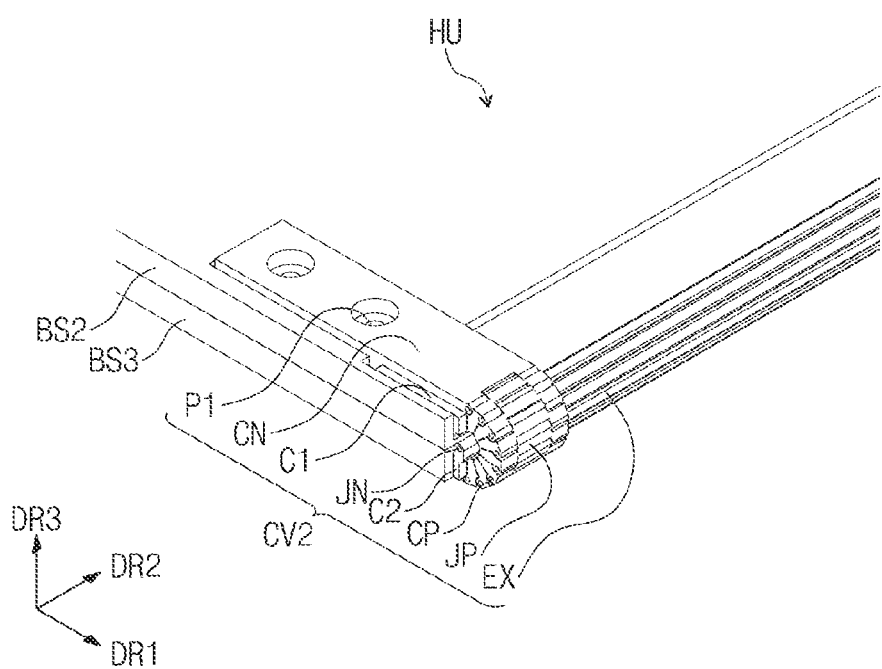
Figure 9:
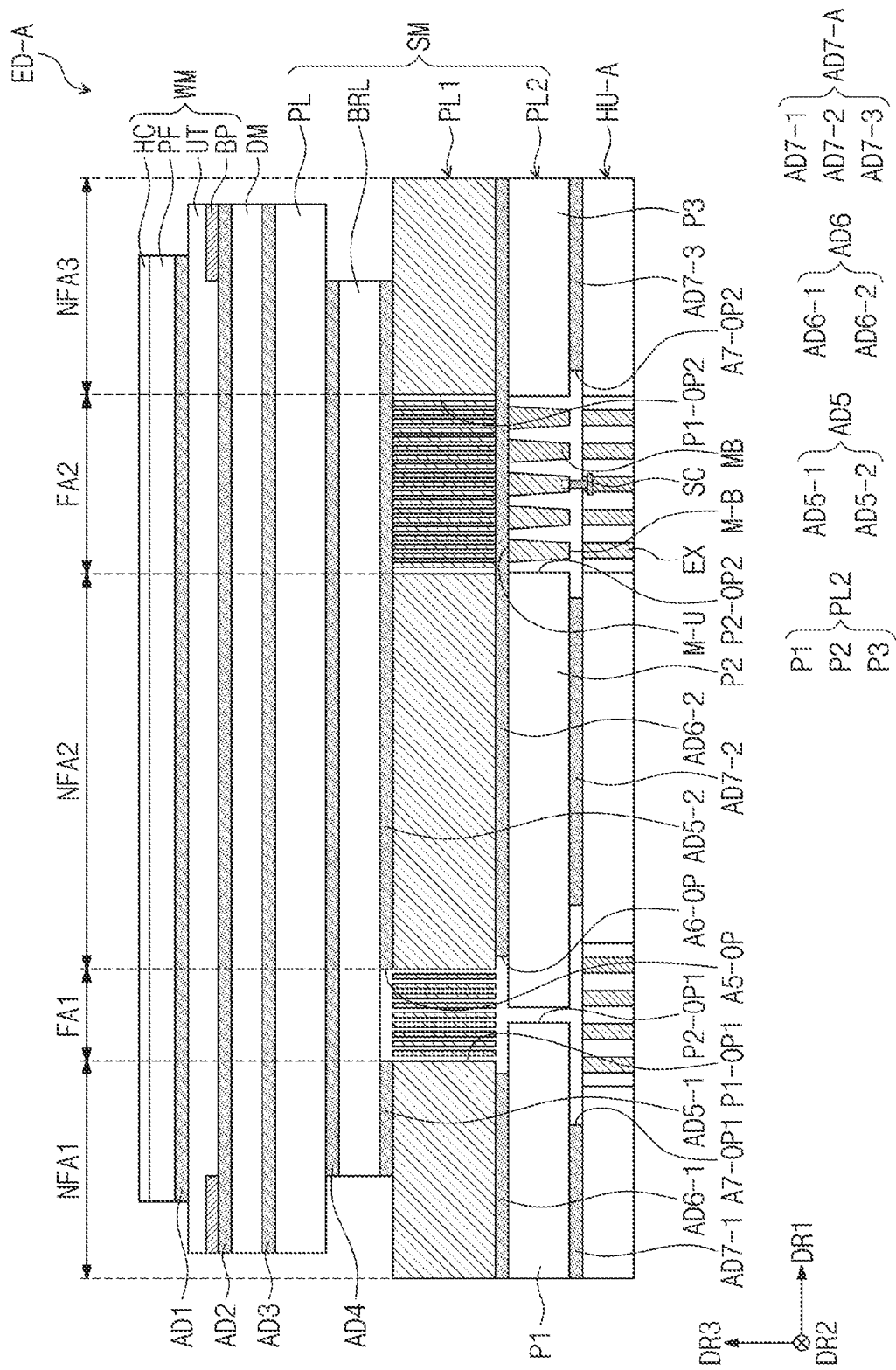
FIG. 9 is a cross-sectional view of an electronic device according to an embodiment of the present disclosure.

FIGS. 8A and 8B are perspective views of the hinge member HU according to an embodiment of the present disclosure. FIG. 9 is a cross-sectional view of an electronic device according to an embodiment of the present disclosure.

FIGS. 8A and 8B show the second multi-joint unit CV2 that is outwardly folded, and second and third base portions BS2 and BS3 coupled to the second multi-joint unit CV2 among the base portions BS1, BS2, and BS3 and the multi-joint units CV1 and CV2 of the hinge member HU shown in FIG. 4A. The first multi-joint unit CV1 that is inwardly folded is not particularly limited, as long as the hinge member HU includes a structure inwardly folded.

Referring to FIGS. 8A and 8B, the second multi-joint unit CV2 may include guide portions EX, joint portions JP, coupling pins CP, a coupling portion CN, a first cover portion C1, a second cover portion C2, and a hinge portion JN.

The guide portions EX may overlap the second folding portion FA2 (refer to FIG. 4A). The guide portions EX may be disposed between the second base portion BS2 and the third base portion BS3. Each of the guide portions EX may extend in the second direction DR2. The number of the guide portions EX may be changed depending on a curvature of the second folding portion FA2, and is not particularly limited. The guide portions EX may support components disposed thereon.

The joint portions JP may be connected to the guide portions EX in a one-to-one correspondence. The joint portions JP may be configured to be substantially rotated in the hinge member HU. The joint portions JP may be coupled to adjacent joint portions JP. For example, the coupling pins CP may connect the joint portions JP, and thus, the joint portions JP may be rotatably coupled to each other.

The coupling portion CN may extend from the joint portions disposed at both end positions among the joint portions JP in the first direction DR1. The coupling portion CN may include pin holes P1. The coupling portion CN may be coupled to the second base portion BS2 by bolts through some pin holes among the pin holes P1, and may be coupled to the third base portion BS3 by bolts through the other pin holes among the pin holes P1.

The guide portions EX and the joint portions JP may be stably coupled to the base portions BS2 and BS3 by the coupling portion CN.

The second multi-joint unit CV2 may include the first cover portion C1, the second cover portion C2, and the hinge portion JN. The guide portions EX disposed at a left side among the guide portions EX, the joint portions JP connected to the guide portions EX disposed at the left side, and a portion of the coupling portion CN may be disposed on the first cover portion C1, and the guide portions EX disposed at a right side among the guide portions EX, the joint portions JP connected to the guide portions EX disposed at the right side, and the other portion of the coupling portion CN may be disposed on the second cover portion C2.

The hinge portion JN may couple the first cover portion C1 to the second cover portion C2 and may rotate corresponding to the joint portions JP when the joint portions JP rotate. Accordingly, the extension portions EX and the joint portions JP, which are disposed on the first cover portion C1 and the second cover portion C2, may be easily rotated.

Referring to FIG. 9, the electronic device ED-A may include a window WM, a display module DM, a lower member SM, and a hinge member HU-A.

The window WM, the display module DM, and the lower member SM, which are included in the electronic device ED-A of FIG. 9, may correspond to the window WM, the display module DM, and the lower member SM of the electronic device ED described with reference to FIG. 4B, respectively.

The hinge member HU-A may be coupled to a second plate PL2 by a seventh adhesive layer AD7-A. The seventh adhesive layer AD7-A may also be referred to as an intermediate adhesive layer. The seventh adhesive layer AD7-A may include a first portion AD7-1 (also referred to as, e.g., a third portion) overlapping the first non-folding portion NFA1, a second portion AD7-2 (also referred to as, e.g., a fourth portion) overlapping the second non-folding portion NFA2, and a third portion AD7-3 (also referred to as, e.g., a fifth portion) overlapping the third non-folding portion NFA3.

The hinge member HU-A may include a bolt SC provided to one of guide portions EX. The guide portion including the bolt SC may be disposed at a center of the guide portions EX. The bolt SC may be provided in plural on one guide portion, and the bolts may be spaced apart from each other on the guide portion along the second direction DR2.

The bolt SC may be coupled to a stick MB overlapping the bolt SC. A portion of the bolt SC may be fastened with the stick MB from a rear surface M-B of the stick MB, and may be placed inside the stick MB.

The first portion AD7-1 and the second portion AD7-2 may be arranged in the first direction DR1 and may be spaced apart from each other by a first separation space A7-OP1. The second portion AD7-2 and the third portion AD7-3 may be arranged in the first direction DR1 and may be spaced apart from each other by a second separation space A7-OP2. The first separation space A7-OP1 may overlap the first folding portion FA1, and the second separation space A7-OP2 may overlap the second folding portion FA2.

In an embodiment, as the seventh adhesive layer AD7-A may be provided with the separation spaces A7-OP1 and A7-OP2 defined therethrough to respectively overlap the folding portions FA1 and FA2, the hinge member HU-A and the second plate PL2 may be easily folded without being interfered with by the seventh adhesive layer AD7-A when the second plate PL2 is folded.

According to an embodiment, since the stick MB disposed inside the second plate PL2 is coupled to the guide portion EX by the bolt SC in the second folding portion FA2 that is outwardly folded, a separate coupling member to couple the hinge member HU-A to the lower member SM may be omitted, and the hinge member HU-A, the lower member SM, and the display module DM may be stably coupled to each other during the outer-folding operation. Accordingly, the folding characteristics of the electronic device ED-A may be improved.

Figure 10:
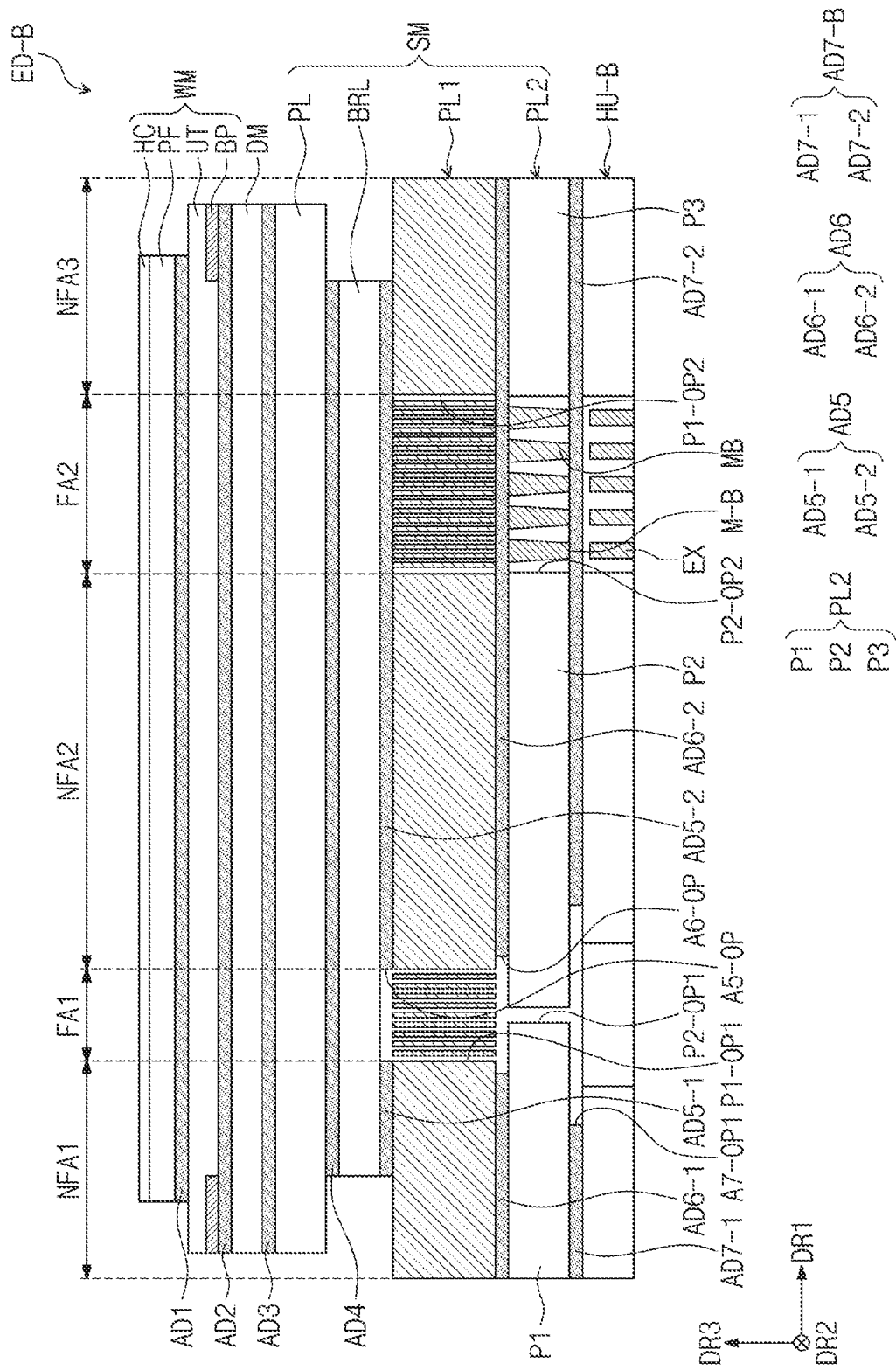
FIG. 10 is a cross-sectional view of an electronic device according to an embodiment of the present disclosure.

FIG. 10 is a cross-sectional view of an electronic device according to an embodiment of the present disclosure. In FIG. 10, the same reference numerals denote the same elements in FIGS. 8A, 8B, and 9, and thus, for convenience of explanation, a further description thereof will be omitted.

Referring to FIG. 10, the electronic device ED-B may include a window WM, a display module DM, a lower member SM, and a hinge member HU-B.

The window WM, the display module DM, and the lower member SM of the electronic device ED-B of FIG. 10 may correspond to the window WM, the display module DM, and the lower member SM of the electronic device ED described with reference to FIG. 4B.

In an embodiment, the hinge member HU-B may be coupled to a second plate PL2 by a seventh adhesive layer AD7-B. The seventh adhesive layer AD7-B may include a first portion AD7-1 and a second portion AD7-2.

The first portion AD7-1 and the second portion AD7-2 may be arranged in the first direction DR1 and may be spaced apart from each other by a first separation space A7-OP1. The first separation space A7-OP1 may overlap the first folding portion FA1.

According to an embodiment, as a rear surface M-B of each of sticks MB is attached to the second portion AD7-2 of the seventh adhesive layer AD7-B, the hinge member HU-B may be coupled to the sticks MB. Guide portions EX may be spaced apart from the second portion AD7-2, which may reduce interference with the second portion AD7-2 during the outer-folding operation. However, embodiments are not limited thereto. According to an embodiment, the guide portions EX may be in contact with the second portion AD7-2.

Figure 11:
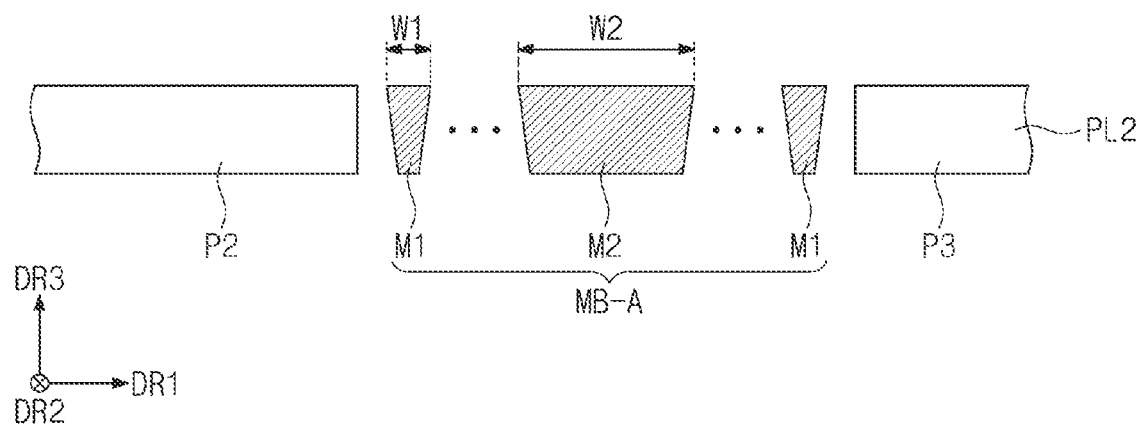
FIG. 11 is a cross-sectional view of a second plate and sticks according to an embodiment of the present disclosure.
Figure 12:
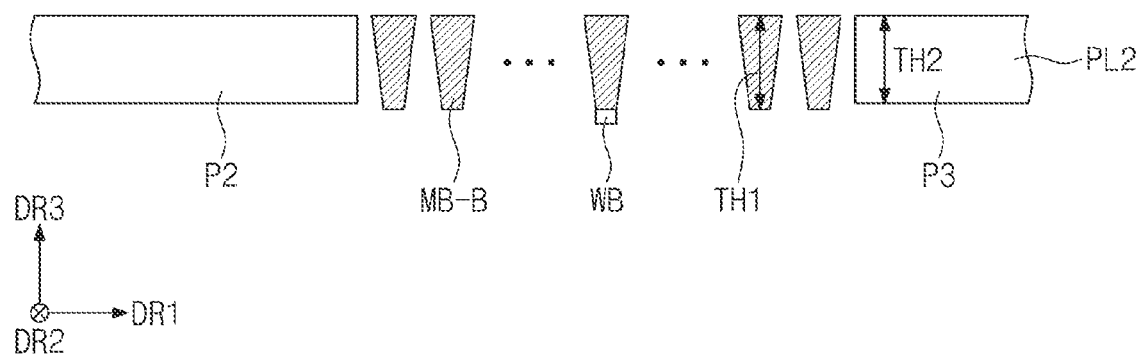
FIG. 12 is a cross-sectional view of a second plate and sticks according to an embodiment of the present disclosure.
Figure 13:
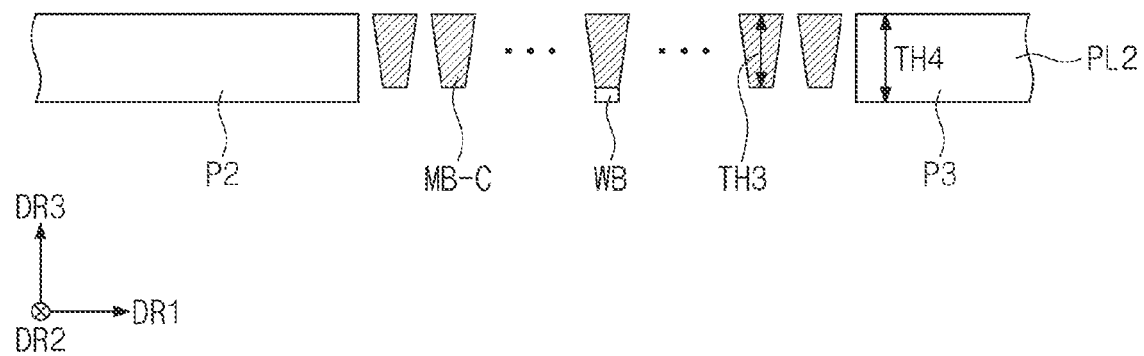
FIG. 13 is a cross-sectional view of a second plate and sticks according to an embodiment of the present disclosure.

FIG. 11 is a cross-sectional view of a second plate PL2 and sticks MB-A according to an embodiment of the present disclosure. FIG. 12 is a cross-sectional view of a second plate PL2 and sticks MB-B according to an embodiment of the present disclosure. FIG. 13 is a cross-sectional view of a second plate PL2 and sticks MB-C according to an embodiment of the present disclosure.

Referring to FIG. 11, the sticks MB-A may include first sticks M1 and at least one second stick M2 having a width different from that of the first sticks M1. A width W1 in the first direction DR1 of each of the first sticks M1 may be smaller than a width W2 in the first direction DR1 of the second stick M2.

The sticks MB-A may overlap the second folding portion FA2-b (refer to FIG. 3C) outwardly folded with respect to two folding axes FX2-1 and FX2-2 described with reference to FIG. 3C.

As an example, the first sticks M1 may overlap the curved portions F4 and F5, and the second stick M2 may overlap the extension portion F6.

Referring to FIG. 12, one of the sticks MB-B may further include a stick nut WB. The stick nut WB may be fastened with a bolt SC provided to a guide portion EX described with reference to FIG. 9. The stick nut WB may be attached to at least one of the sticks MB-B by, for example, a welding process, or may be formed by, for example, an injection process of the sticks MB-B.

In an embodiment, the sticks MB-B may have a first thickness TH1 greater than a second thickness TH2 of the second plate PL2. Accordingly, the stick nut WB may protrude downward from the second plate PL2.

Referring to FIG. 13, one of the sticks MB-C may further include a stick nut WB. The stick nut WB may be fastened with a bolt SC provided to a guide portion EX described with reference to FIG. 9. The stick nut WB may be attached to at least one of the sticks MB-C by, for example, a welding process, or may be formed by, for example, an injection process of the sticks MB-C.

In an embodiment, the sticks MB-C may have a third thickness TH3, which is smaller than a fourth thickness TH4 of the second plate PL2. Accordingly, in an embodiment, the stick nut WB does not protrude to the second plate PL2 and may be disposed inside the second plate PL2.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. An electronic device, comprising:
a display module comprising a first non-folding portion, a first folding portion configured to be folded and having a predetermined radius of curvature when folded, a second non-folding portion, a second folding portion configured to be folded and having a radius of curvature different from the radius of curvature of the first folding portion when folded, and a third non-folding portion,
wherein the first non-folding portion, the first folding portion, the second non-folding portion, the second folding portion, and the third non-folding portion are spaced apart from each other in a first direction;
a first plate disposed under the display module, and comprising a plurality of first openings overlapping the first folding portion and a plurality of second openings overlapping the second folding portion;
a second plate comprising a first substrate overlapping a portion of the first folding portion and the first non-folding portion, a second substrate spaced apart from the first substrate and overlapping a portion of the first folding portion and the second non-folding portion, and a third substrate spaced apart from the second substrate and overlapping the third non-folding portion;
an adhesive layer disposed between the first plate and the second plate and comprising a first portion overlapping the first folding portion and a second portion spaced apart from the first portion; and
a plurality of sticks disposed between the second substrate and the third substrate and spaced apart from each other in the first direction,
wherein a portion of the second portion of the adhesive layer overlapping the second folding portion is exposed through spaces between adjacent sticks among the sticks.

2. The electronic device of claim 1, wherein each of the sticks has a thickness equal to or greater than about 80 micrometers and equal to or less than about 1000 micrometers.

3. The electronic device of claim 1, wherein a pitch between the adjacent sticks among the sticks is equal to or greater than about 100 micrometers and equal to or less than about 300 micrometers.

4. The electronic device of claim 1, wherein each of the sticks has a width in the first direction that is about equal to or greater than two times and about equal to or less than three times of a width of a portion of the first plate, which is disposed between adjacent second openings among the second openings.

5. The electronic device of claim 1, wherein each of the sticks has a width that gradually decreases in a direction from the first plate toward the second plate.

6. The electronic device of claim 1, further comprising:
a hinge member disposed under the second plate and comprising first guide portions overlapping the first folding portion and second guide portions overlapping the second folding portion,
wherein the hinge member is configured to be folded with the display module.

7. The electronic device of claim 6, wherein at least one of the second guide portions is coupled to at least one of the sticks.

8. The electronic device of claim 7, further comprising:
a nut disposed under at least one of the sticks; and
a bolt provided to one of the second guide portions and fastened to the nut.

9. The electronic device of claim 8, further comprising:
an intermediate adhesive layer, wherein the intermediate adhesive layer is disposed between the second plate and the hinge member and comprises:
a third portion overlapping the first non-folding portion;
a fourth portion spaced apart from the third portion and overlapping the second non-folding portion; and
a fifth portion spaced apart from the fourth portion with the sticks interposed therebetween.

10. The electronic device of claim 8, wherein each of the sticks has a thickness different from a thickness of the second plate.

11. The electronic device of claim 7, further comprising:
an intermediate adhesive layer disposed between the second plate and the hinge member and comprising a third portion overlapping the first non-folding portion and a fourth portion spaced apart from the third portion,
wherein the sticks are attached to a portion of the fourth portion, which overlaps the second folding portion.

12. The electronic device of claim 1, wherein an area in which the second openings of the first plate are arranged is greater than an area in which the first openings of the first plate are arranged.

13. The electronic device of claim 1, wherein the display module further comprises an upper surface through which an image is displayed, and a lower surface opposite to the upper surface,
wherein the first folding portion is configured to be folded such that the upper surface of the first non-folding portion of the display module faces the upper surface of the second non-folding portion of the display module, and the second folding portion is configured to be folded such that the lower surface of the second non-folding portion of the display module faces the lower surface of the third non-folding portion.

14. The electronic device of claim 13, wherein the first folding portion comprises extension portions adjacent to the first non-folding portion and the second non-folding portion and a curved portion disposed between the extension portions, and a separation distance between adjacent extension portions among the extension portions is changed along the first direction when the first folding portion is in a folded state.

15. The electronic device of claim 13, wherein the second folding portion is configured to be folded with respect to two folding axes, and a width in the first direction of a stick disposed between the two folding axes is greater than a width in the first direction of the sticks adjacent to the stick disposed between the folding axes.

16. The electronic device of claim 1, further comprising:
a window disposed on the display module;
a protective layer; and
a barrier layer,
wherein the protective layer and the barrier layer are disposed between the first plate and the display module.

17. The electronic device of claim 1, wherein the second plate comprises one of a metal material and a plastic material.

18. The electronic device of claim 1, wherein the first plate comprises one of stainless steel, titanium, and a reinforced fiber composite material.

19. An electronic device, comprising:
a display module comprising a first non-folding portion, a first folding portion configured to be folded and having a predetermined radius of curvature when folded, a second non-folding portion, a second folding portion configured to be folded and having a radius of curvature different from the radius of curvature of the first folding portion when folded, and a third non-folding portion,
wherein the first non-folding portion, the first folding portion, the second non-folding portion, the second folding portion, and the third non-folding portion are spaced apart from each other in a first direction;
a first plate disposed under the display module, and comprising a plurality of first openings overlapping the first folding portion and a plurality of second openings overlapping the second folding portion;
a second plate comprising a first substrate overlapping a portion of the first folding portion and the first non-folding portion, a second substrate spaced apart from the first substrate and overlapping a portion of the first folding portion and the second non-folding portion, and a third substrate spaced apart from the second substrate and overlapping the third non-folding portion;
a plurality of sticks disposed between the second substrate and the third substrate and spaced apart from each other in the first direction; and
a hinge member disposed under the second plate, configured to be folded with the display module, and comprising first guide portions overlapping the first folding portion and second guide portions overlapping the second folding portion,
wherein at least one of the second guide portions is coupled to at least one of the sticks.

20. The electronic device of claim 19, further comprising:
a nut disposed under at least one of the sticks; and
a bolt provided to one of the second guide portions and fastened to the nut.

21. The electronic device of claim 19, further comprising:
an intermediate adhesive layer disposed between the second plate and the hinge member, and comprising a first portion overlapping the first non-folding portion and a second portion spaced apart from the first portion,
wherein the second guide portions are attached to the sticks and a portion of the intermediate adhesive layer, which overlaps the second folding portion.

22. The electronic device of claim 19, wherein the display module further comprises an upper surface through which an image is displayed, and a lower surface opposite to the upper surface,
wherein the first folding portion is configured to be folded such that the upper surface of the first non-folding portion of the display module faces the upper surface of the second non-folding portion of the display module, and the second folding portion is configured to be folded such that the lower surface of the second non-folding portion of the display module faces the lower surface of the third non-folding portion.

* * * * *